United States Patent [19]

Johnson

[11] Patent Number: 5,119,578
[45] Date of Patent: Jun. 9, 1992

[54] LIGHTED SLIP BOBBER FISHING APPARATUS

[76] Inventor: Bryan L. Johnson, 8231 E. Beatrice Dr., Clear Lake, Minn. 55319

[21] Appl. No.: 798,510

[22] Filed: Nov. 26, 1991

[51] Int. Cl.$^5$ ............................................. A01K 93/00
[52] U.S. Cl. ........................................ 43/17; 43/17.5
[58] Field of Search ............... 43/17, 17.5, 44.9, 44.91

[56] References Cited

U.S. PATENT DOCUMENTS

| | | | |
|---|---|---|---|
| 2,110,596 | 3/1938 | Gaede | 43/17 |
| 2,334,819 | 11/1943 | Good | 43/17 |
| 2,654,972 | 10/1953 | Hollingsworth | 43/17 |
| 2,777,238 | 1/1957 | Taylor | 43/17 |
| 3,739,513 | 6/1973 | Durham | 43/17 |
| 3,824,731 | 7/1974 | Sandschaper | 43/17.5 |
| 4,070,784 | 1/1978 | Yokogawa | 43/17.5 |
| 4,109,404 | 8/1978 | Preeschl | 43/17 |
| 4,461,114 | 7/1984 | Riead | 43/17.5 |

Primary Examiner—Kurt Rowan
Attorney, Agent, or Firm—Merchant, Gould, Smith, Edell, Welter & Schmidt

[57] ABSTRACT

The present invention provides a fishing apparatus of a type that secures to a fishing line having a remote end. A float member is slideably secured relative to the fishing line, and a depth signaling means is operatively connected to the float member. A stopping means is operatively connected to the fishing lie at a predetermined distance from the remote end to prevent the float member from sliding beyond the predetermined distance from the remote end of the fishing line. Thus, the stopping means effectively establishes a maximum depth to which the remote end may descend when the float member is afloat. The depth signaling means signals when the float member has slid the predetermined distance from the remote end of the fishing line, and hence, when the remote end has descended to the predetermined maximum depth.

12 Claims, 2 Drawing Sheets

LIGHTED SLIP BOBBER FISHING APPARATUS

FIELD OF THE INVENTION

The present invention relates generally to fishing apparatus, and more particularly, to a lighted slip bobber that signals when the baited end of a fishing line has descended to a predetermined depth.

BACKGROUND OF THE INVENTION

For as long as fishermen have been catching fish at the end of a fishing line, various bait and tackle have been available to assist fishermen with their objective. Typically, the various bait and tackle are designed for a particular type of fishing and perhaps, even for a specific type of fish. For example, lures can be drawn through the water to simulate indigenous aquatic life, or bait can simply be affixed to a hook and lowered into the water.

One particularly useful and common fishing aid for bait fishing is the bobber, which is commercially available in a wide variety of shapes and sizes. Not only does a bobber indicate when a fish is nibbling at the bait, but it also enables the fisherman to present the bait at a specific depth in the water. Recognizing that successful fishing may be a function of the depth at which the bait is presented, experienced fishermen typically attach a bobber to the fishing line at a specific distance from the baited end of the line. Since the bait will tend to sink, while the bobber will tend to float, the specific distance between the bobber and the baited end of the line will determine the depth at which the bait will descend in the water.

Certain known bobbers are suitable for the aboveidentified purposes during daylight hours but become ineffective in the dark. In response to this shortcoming and as a result of advances in technology, lighted bobbers have been developed so that the bobber is visible in the dark. However, these lighted bobbers do not indicate when the bait has reached the desired depth, and the conventional "tip-up" bobbers are inadequate for this purpose in the dark. Accordingly, a need exists for a bobber that provides all of the benefits of conventional daylight bobbers, but in the dark.

SUMMARY OF THE INVENTION

The present invention provides a fishing apparatus of a type that secures to a fishing line having a remote end. A float member is slideably secured relative to the fishing line, and a depth signaling means is operatively connected to the float member. A stopping means is operatively connected to the fishing line at a predetermined distance from the remote end to prevent the float member from sliding beyond the predetermined distance from the remote end of the fishing line. Thus, the stopping means effectively establishes a maximum depth to which the remote end may descend when the float member is afloat. The depth signaling means signals when the float member has slid the predetermined distance from the remote end of the fishing line, and hence, when the remote end has descended to the predetermined maximum depth.

In a preferred embodiment, the apparatus includes activating means operatively connected to the depth signaling means, and activation signaling means operatively connected to the activating means. The activating means includes a first part that is rotatable relative to a second part to activate and deactivate the depth signaling means, and the activation signaling means includes a green light emitting diode that signals when the depth signaling means is activated. When the float member has slid the predetermined distance from the remote end, the green light turns off, and a red light forming a part of the depth signaling means turns on.

The present invention provides a bobber that is fully functional in the dark, as well as in daylight. In the dark, the green light indicates that the bobber is operational, and the red light indicates when the remote end has descended the maximum predetermined depth below the water surface. Additionally, the absence of any light indicates that a fish has pulled the bobber beneath the surface of the water. Furthermore, the light emitting feature of the present invention can be conveniently activated and deactivated by simply rotating a first part relative to a second part. These and other advantages will become apparent to those skilled in the art upon a more detailed discussion of a preferred embodiment.

BRIEF DESCRIPTION OF THE DRAWING

Referring to the Figures, wherein like numerals represent like parts throughout the several views.

DETAILED DESCRIPTION OF A PREFERRED EMBODIMENT

Figure 1:
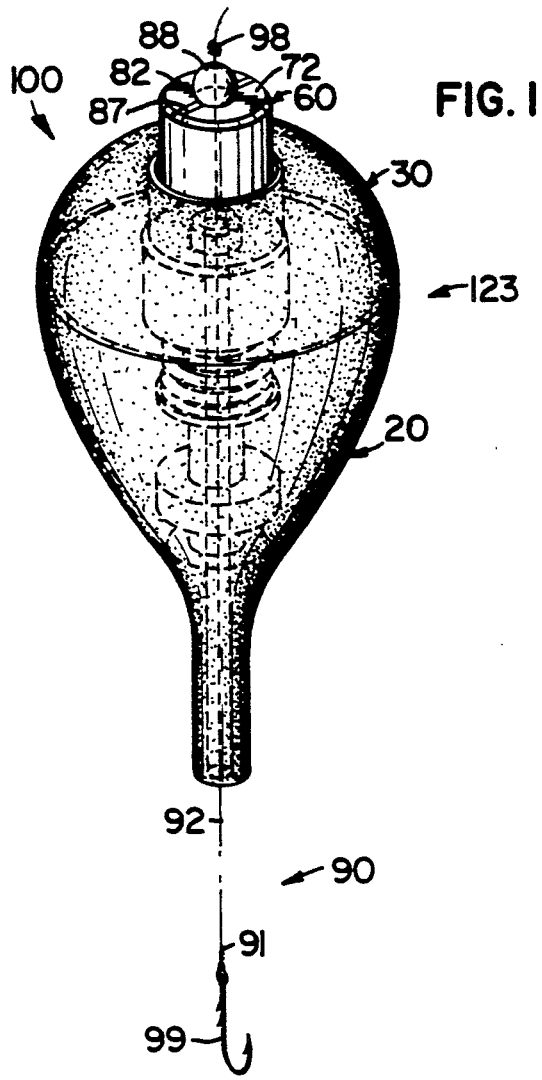
FIG. 1 is a perspective view of a bobber constructed according to the principles of the present invention.

Referring to FIG. 1, an apparatus constructed according to the principles of the present invention is designated generally at 100. The apparatus (or bobber assembly) 100 includes a bottom member (or base member) 20, .1 a top member 30, a signal member 60, and a stop member 88. The entire assembly is slideably secured to a fishing line 90 between a knot 98 in the line 90 and a hook means 99 secured to a remote end 91 of the line 90.

Figure 2:
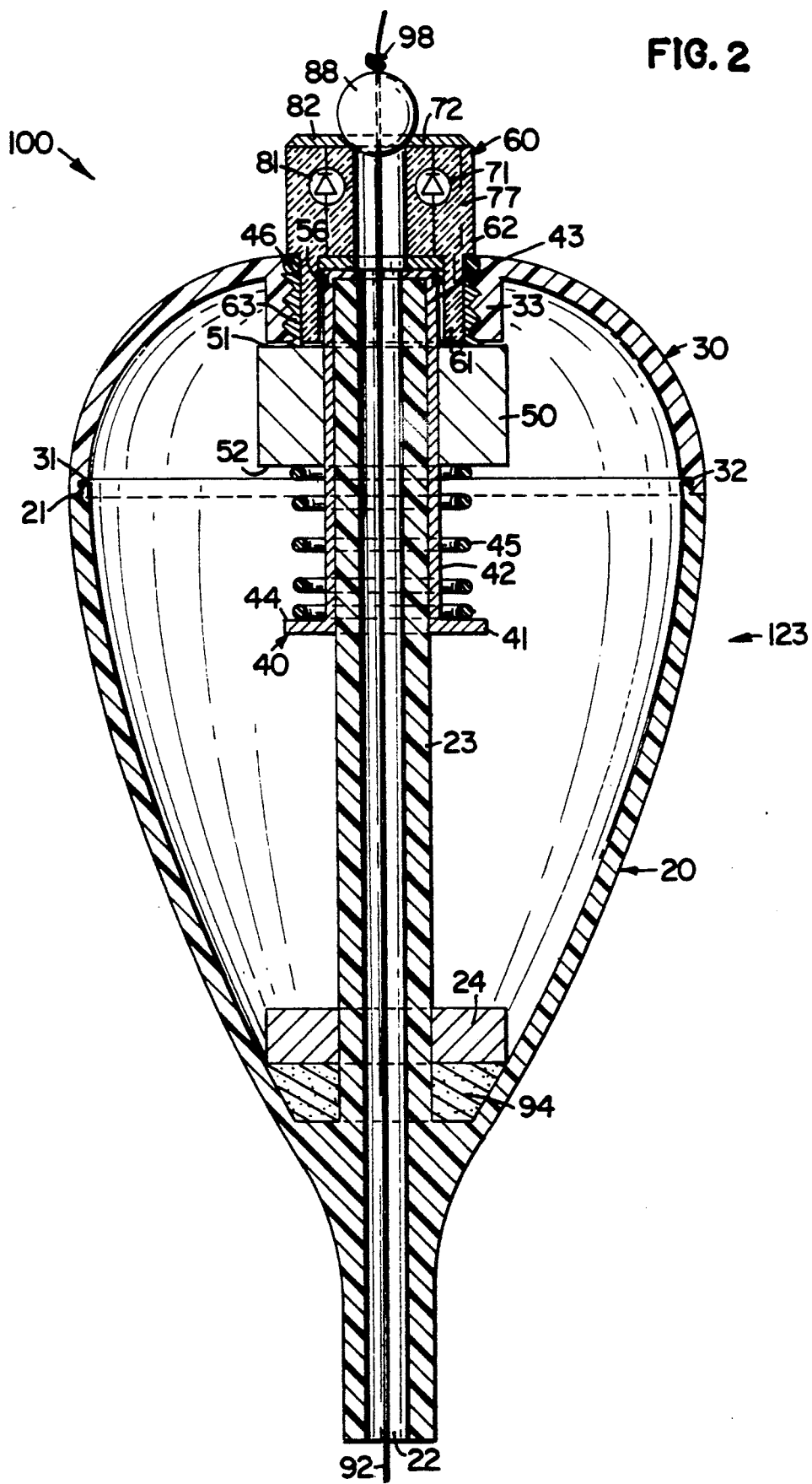
FIG. 2 is a sectioned side view of the bobber shown in FIG. 1.

Referring to FIG. 2, the base member 20 and the top member 30 are secured to one another by interengaging threads 21 and 31, respectively, to form a float member 123. The connection between the base member 20 and the top member 30 is sealed by an 0-ring 32 to prevent water from entering the interior of the float member 123. In a preferred embodiment, the base member 20 and the top member 30 are rigid, plastic shell pieces. However, those skilled in the art will recognize that the float member 123 may be solid and/or made of other materials, such as cork, foam, or rubber. The ultimate design consideration in this regard is that the float member 123 be sufficiently buoyant to function as a bobber.

The base member 20 includes a central longitudinal shaft 22 extending the length of the base member 20, and through which a fishing line 90 may be threaded. In a preferred embodiment, the central longitudinal shaft 22 is defined by a central longitudinal tube member 23 extending the length of the base member 20. A ballast weight 24 is mounted within the lower portion of the base member 20 to stabilize the float member 123 in an upright position once the hook means 99 has reached the desired depth (as discussed below). In a preferred embodiment, the ballast weight 24 is a cylindrical shell concentrically mounted about the central longitudinal tube member 23 and secured in place by glue means 94.

A battery retention member 40, which is made of a conductive material (brass in a preferred embodiment), is concentrically mounted about the upper portion of the central longitudinal tube member 23. The battery retention member 40 has a series of integral, cylindrical shell portions, including a lower lip section 41, an intermediate sleeve section 42, and an upper cap section 43. The inner radii of the lower lip section 41 and the intermediate sleeve section 42 are larger than the outer radius of the central tube member 23, whereas the inner radius of the upper cap section 43 is smaller than the outer radius of the central tube member 23. As a result, the lower lip section 41 and the intermediate sleeve section 42 may be fitted onto the central tube member 23, and slid downward over the central tube member 23 to the point at which the upper cap section 43 contacts the upper end of the central tube member 23. The outer radius of the lower lip section 41 is significantly larger than that of the intermediate sleeve section 42, thereby defining a ledge 44 between the lower lip section 41 and the intermediate sleeve section 42. The ledge 44 extends perpendicularly from the longitudinal axis defined by the central longitudinal tube member 23 and provides support for a coil spring 45, which is also made of a conductive material (brass in a preferred embodiment). The coil spring 45 fits over the upper cap section 43 and the intermediate sleeve member 42. The coil spring 45 has an inner radius greater than the outer radii of the upper cap section 43 and the intermediate sleeve member 42, and an outer radius less than the outer radius of the lower lip section 41.

A battery 50 fits over the upper cap section 43 and the intermediate sleeve member 42 to rest upon the coil spring 45. The battery 50 also has an inner radius greater than the outer radii of the upper cap section 43 and the intermediate sleeve member 42. The battery 50 is held against the force of the coil spring 45 by the lowermost portion of internal threads 33 formed in the top member 30, and extending downward from the top of the float member 123. The top 51 of the battery 50 faces toward the signal member 60 and serves as the negative terminal. The bottom 52 of the battery 50 faces toward the ballast weight 24 and serves as the positive terminal. Thus, the positive terminal 52 is conductively connected to the battery retention member 40 by way of the conductive coil spring 45, which is in direct contact with the bottom 52 of the battery 50 and with the lower lip section 41 of the battery retention member 40.

In a preferred embodiment, the battery 50 is a 3 volt lithium battery with at least 70 mA hours of capacity, and the battery 50 is configured as a cylindrical shell. The relative sizes and locations of the aforementioned bobber components are such that the battery 50 is held between the internal threads 33 and the coil spring 45 when the top member 30 is screwed to the base member 20.

The internal threads 33 are configured to mate with external threads 63 on the signal member 60, allowing the signal member 60 to be releasably secured to the top member 30. The signal member 60 has two distinct cylindrical shell portions—a lower threaded portion 61 and an upper display portion 62, both of which align relative to the central tube member 23 so as not to obstruct the longitudinal shaft 22. An inner 0-ring 56 is positioned within the inner radius of the lower threaded portion 61 to provide a water tight seal between the lower threaded portion 61 and the upper cap section 43 of the battery retention member 40. Also, an outer 0-ring 46 is positioned about the outer radius of the lower threaded portion 61 to provide a water tight seal between the lower threaded portion 61 and the top member 30.

The lower threaded portion 61, which bears the external threads 63, has an inner radius greater than the outer radius of the upper cap section 43 and the intermediate sleeve section 42 of the battery retention member 40. Thus, as the signal member 60 is screwed deeper into the top member 30, the lower threaded portion 61 descends around the upper cap section 43 and some portion of the intermediate sleeve section 42. The lower threaded portion 61 is free to continue downward beyond the lowermost of the internal threads 33 and into contact with the top 51 of the battery 50, thereby displacing the battery 50 away from the internal threads 33 against the compression force of the coil spring 45. The external threads 63 are made of a conductive material (brass in a preferred embodiment), so that contact with the top of the battery 50 establishes a conductive pathway from the negative terminal 51 of the battery 50 through the external threads 63.

Figure 4:
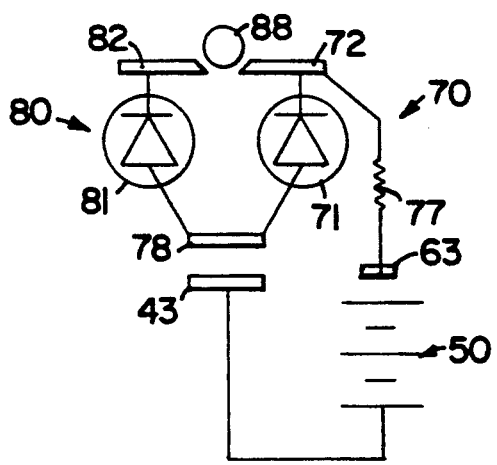
FIG. 4 is a schematic diagram of the circuitry formed by the structure shown in FIG. 2.
Figure 3:
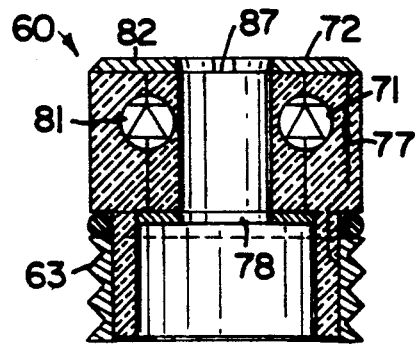
FIG. 3 is an enlarged, sectioned side view of the cap member shown in FIG. 2.

The signal member 60 is made of a molded light diffusing epoxy, and it houses two electrically isolated conductive pathways 70 and 80, which are shown schematically in FIG. 4. As shown in FIG. 3, a spacer 87 made of an insulating material (the same light diffusing molded epoxy as the body of the signal member 60 in a preferred embodiment) is positioned between the upper conductive contacts 72 and 82 and serves to isolate the conductive pathways from one another. The first conductive pathway 70 includes a green light emitting diode 71, which functions as an activation signaling means for the bobber assembly 100. The second conductive pathway 80 includes a red light emitting diode 81, which functions as a depth signaling means, as will be explained in greater detail below. The forward biasing voltage of the red light emitting diode 81 is lower than that of the green light emitting diode 71, such that the second conductive pathway 80 offers the path of lesser resistance when both pathways forward biasing voltage of the green light emitting diode 71 is approximately 1.8-2.0 volts, and the forward biasing voltage of the red light emitting diode 81 is approximately 1.5-1.7 volts.

The first conductive pathway 70 extends from the external threads 63 through an optional current limiting resistor 77, through a first upper conductive contact 72, through the green light emitting diode 71, to a lower conductive contact 78. The lower conductive contact 78 is axially aligned with the upper cap section 43 of the battery retention member 40, relative to the longitudinal axis of the central tube member 23. As the signal member 60 is screwed deeper into the top member 30, beyond the point at which the lower threaded portion 61 contacts the top 51 of the battery 50, the lower conductive contact 78 eventually contacts the upper cap section 43 of the battery retention member 40. Recognizing that the battery retention member 40 is conductively connected to the positive terminal 52 of the battery 50, the contact between the lower conductive contact 78 and the upper cap section 43 of the battery retention member 40 establishes a closed circuit through the first conductive pathway 70. Thus, current flows through and thereby forward biases the green light emitting diode 71, which shines through the light diffusing molded epoxy and indicates that the bobber 100 is operational.

The second conductive pathway 80 extends from a second upper conductive contact 82 through the red light emitting diode 81, to the lower conductive contact 78, which is conductively connected to the positive terminal 52 of the battery 50, as explained above. However, the second upper conductive contact 82 is not conductively connected to the external threads 63, and thus, the second conductive pathway 80 does not extend directly to the negative terminal 51 of the battery 50. Therefore, in order for current to flow through the red emitting diode 81, current must flow from the first upper conductive contact 72 to the second upper conductive contact 82.

The stop member 88, which is made of a conductive material (brass in a preferred embodiment), is slideably secured to the fishing line 90 between the knot 98 and the upper conductive contacts 72 and 82. When in contact with both of the upper conductive contacts 72 and 82, the stop member 88 provides a satisfactory bridge for current to flow from the first upper conductive contact 72 to the second upper conductive contact 82. Under such circumstances, the red light emitting diode 81 is forward biased at the expense of the green light emitting diode 71, because the second conductive pathway 80 offers the path of lesser resistance.

The bobber assembly 100 is used in connection with a fishing line 90 having a remote end 91. A knot 98 is formed in the fishing line 90 at a predetermined distance from the remote end 91. The portion of line extending between the knot 98 and the remote end 91 may be referred to as a remote section 92 of the fishing line 90. The remote end 91 of the fishing line 90 is threaded through the stop member 88 to slideably secure the stop member 88 to the line 90. The remote end 91 is then threaded through the signal member 60 and the float member 123 (from top to bottom) to slideably secure the signal member 60 and the float member 123 to the line 90. A hook means 99 is then secured to the remote end 91, thereby capturing the bobber assembly between the knot 98 and the hook means 99.

In use, the bobber assembly 100 is operatively connected to the fishing line 90 as described above, and the signal member 60 is screwed all the way into the top member 30 of the float member 123. The resulting contact between the lower conductive contact 78 of the signal member 60 and the upper cap section 43 of the battery retention member 40 closes the circuitry of the first conductive pathway 70, thereby energizing the green light emitting diode 71.

The green light indicates that the apparatus is operational. The remote section 92 of the fishing line 90, including the stop member 88, the signal member 60 secured to the float member 123, and the hook means 99, is then cast over a body of water. Upon landing on the water surface, the float member 123 will tend to float and thus, remain at the water surface, while the hook means 99 at the remote end 91 of the line 90 will tend to sink below the surface toward the bottom of the body of water. The hook means 99 will sink to a maximum depth according to the predetermined length of the remote section 92, at which point the stop member 88 will contact the upper conductive contacts 72 and 82, thereby transferring the weight load of the hook means 99 to the float member 123. The contact between the stop member 88 and the upper conductive contacts 72 and 82 will also close the circuitry of the second conductive pathway 80, thereby energizing the red light emitting diode 81 at the expense of the green light emitting diode 71. The red light indicates that the hook means 99 has descended to the desired depth, and the disappearance of the red light would suggest that a fish has taken the hook means 99.

In addition to being fully functional in the dark, as well as in daylight, the present invention is more convenient to operate and service than other lighted bobbers currently on the market. For example, a simple twist of the signal member 60 relative to the float member 123 deactivates the apparatus, thereby conserving battery life. Also, a simple twist of the top member 30 relative to the bottom member 20 opens the float member 123 to provide access to the battery 50, as well as the other internal parts. Additionally, the depth signaling means provides a measure of confidence that the hook means 99 is at the desired depth in the water.

While the present invention has been described in terms of a preferred embodiment, those skilled in the art will recognize that the principles of the present invention extend to other embodiments and applications. Accordingly, the scope of the present invention is to be limited only by the appended claims.

What is claimed is:

1. An apparatus of a type that secures to a fishing line having a remote end, comprising:
    (a) a float member slideably secured relative to the fishing line;
    (b) a stopping means, operatively connected to the fishing line at a predetermined distance from the remote end, for stopping said float member from sliding beyond said predetermined distance from the remote end of the fishing line, whereby said predetermined distance establishes a maximum depth to which the remote end may descend when said float member is afloat; and
    (c) a depth signaling means, operatively connected to said float member, for signaling when said float member has slid said predetermined distance from the remote end of the fishing line.

2. An apparatus according to claim 1, further comprising activating means, operatively connected to said depth signaling means, for activating and deactivating said depth signaling means.

3. An apparatus according to claim 2, further comprising activation signaling means, operatively connected to said activating means, for signaling when said depth signaling means is activated.

4. An apparatus according to claim 2, wherein said activating means includes a first activation part that is rotatable in a first direction relative to a second activation part to activate said depth signaling means, and in a second, opposite direction relative to said second activation part to deactivate said depth signaling means.

5. An apparatus according to claim 3, wherein said activation signaling means includes a first light emitting diode that emits a first color of light when said depth signaling means is activated, and said depth signaling means includes a second light emitting diode that emits a second color of light when said float member has slid said predetermined distance from the remote end of the fishing line.

6. A bobber assembly of a type that secures to a fishing line having a free end, comprising:
    (a) a float member, having a top and a bottom and a central shaft extending from said top to said bottom, wherein the free end of the fishing line passes through said shaft from top to bottom to slideably secure the float member to the fishing line, and wherein the free end of the fishing line extending beyond said bottom of said float member is fitted with hook means; and (b) a signal member, rotatably secured to said top of said float member, and through which the fishing line passes, wherein rotation of said signal member in a first direction relative to said float member activates a first light emitting diode, and rotation of said signal member in a second, opposite direction relative to said float member deactivates said first light emitting diode.

7. A bobber assembly according to claim 6, further comprising a conductive stop member, secured relative to the fishing line at a maximum predetermined length from said hook means, thereby defining a remote section of the fishing line between said conductive stop member and said hook means, and wherein said signal member has opposing upper conductive contacts, and contact by said conductive stop member upon said opposing upper conductive contacts activates a second light emitting diode, whereby activation of said second light emitting diode indicates that all of said remote section of the fishing line has passed through said top of said float member.

8. A bobber assembly according to claim 6, wherein said signal member includes a battery configured as a cylindrical shell, and the fishing line passes through said battery.

9. A bobber assembly according to claim 7, wherein said signal member is rotatably secured to said to of said float member by interengaging thread means on said signal member and said top of said float member.

10. A bobber assembly according to claim 7, wherein said top and said bottom of said float member are distinct parts secured relative to one another by interengaging thread means on said top and said bottom.

11. A bobber assembly according to claim 7, further comprising a ballast weight mounted proximate said bottom of said float member.

12. A bobber assembly according to claim 7, wherein said first light emitting diode emits green light at a first forward biasing voltage, and said second light emitting diode emits red light at a second forward biasing voltage, lower than said first forward biasing voltage.

* * * * *

UNITED STATES PATENT AND TRADEMARK OFFICE
CERTIFICATE OF CORRECTION

PATENT NO. : 5,119,578                                      Page 1 of 2

DATED       : June 9, 1992

INVENTOR(S) : Bryan L. Johnson

It is certified that error appears in the above-identified patent and that said Letters Patent is hereby corrected as shown below:

In the Abstract, page 19, line 7, "lie" should read -- line --.

In Column 1, lines 34, 35, "abovei-dentified" should read -- above-identified --.

In Column 2, line 41, delete ".1" after the word "20,".

In Column 2, line 41, "a top ...." should be on the same line as "20,".

In Column 4, line 43, insert -- are closed circuits. In a preferred embodiment, the -- after the word "pathways".

In Column 8, line 8, "to" should read -- top --.

UNITED STATES PATENT AND TRADEMARK OFFICE
CERTIFICATE OF CORRECTION

PATENT NO. : 5,119,578

DATED : June 9, 1992

INVENTOR(S) : Bryan L. Johnson

It is certified that error appears in the above-identified patent and that said Letters Patent is hereby corrected as shown below:

In Column 2, line 21, "DRAWING" should read -- DRAWINGS --.

In Column 4, line 43, "lesser" should read -- least --.

In Column 5, line 27, "lesser" should read -- least --.

Signed and Sealed this

Twenty-first Day of September, 1993

Attest:

BRUCE LEHMAN

Attesting Officer

Commissioner of Patents and Trademarks